Dec. 19, 1967

E. F. MAINS 3,359,394

PERSISTENT CURRENT SWITCH

Filed May 2, 1966

Inventor:
Edward F. Mains,
by Richard A. Speer
His Attorney.

United States Patent Office 3,359,394

Patented Dec. 19, 1967

3,359,394

PERSISTENT CURRENT SWITCH

Edward F. Mains, Scotia, N.Y., assignor to General Electric Company, a corporation of New York Filed May 2, 1966, Ser. No. 546,625

2 Claims. (Cl. 200—166)

ABSTRACT OF THE DISCLOSURE

A persistent current switch for use in superconductive circuits is disclosed comprising a tape-like superconductor which is bifilarly wound about a pair of parallel spaced apart mandrels, an electric resistance wire heater being wound at the same time between the coils. When a current is applied to the heater, the superconductor is changed from the superconductive to the normal state, thereby interrupting the persistent current following through the superconductor.

This invention concerns persistent current switches and more particularly a superconductive persistent current switch comprising a superconductive tape of greater width than thickness, which switch has improved current-carrying capacity and is non-inductive.

In recent years, the development of superconducting systems including superconductive solenoids has resulted in requirements for improved circuit components. Although superconducting solenoids in the early stages of development were capable of producing fields only on the order of 10 to 25 kilogauss, these magnets have increased in size and field-delivering capability to the point that fields of 100 kilogauss and greater are now readily obtainable and fields greatly in excess of these are envisioned. Since there is no power loss in the passage of current through a superconductor, persistent current switches connected across the terminals of a superconducting solenoid permit a field to be set up by the solenoid, which field can be maintained for an indefinite length of time as long as the current flow through the solenoid is not reduced by losses in other parts of the circuit. While persistent current switches of low current capability have been constructed, until the advent of the present invention it had not been feasible to create a persistent current flow in the high current range, high critical field superconductive solenoids.

It is therefore a principal object of this invention to provide a persistent current switch which is capable of losslessly conducting the large currents necessary to maintain persistent current flow in high critical field superconducting solenoids.

It is an additional object of this invention to provide a persistent current switch utilizing a superconductive tape having greater width than thickness which introduces no electrical losses into a superconducting persistent current system.

It is a further object of this invention to provide a process for producing a superconducting persistent current switch having high current-carrying capacity.

Other objects and advantages of this invention will be in part obvious and in part explained by reference to the accompanying specification and drawings.

Figure 1:
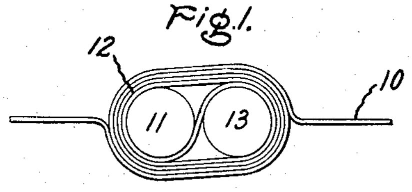
FIGURE 1 is a top elevation of the winding of a persistent current switch according to this invention.

Broadly, the persistent current switch of the present invention comprises a tape-like superconductor of greater width than thickness which is wound bifilarly about two mandrels so that no inductive losses arise from the operation of the switch. Included with the bifilarly-wound tape are suitable electrical heating means such as an electric-resistance wire which is wound directly into the coil so that it can be heated at will to drive it from the superconductive to the normally conductive state. The process comprises doubling the tape upon itself by bending it around one of the mandrels and then bending the doubled tape about the other of the two mandrels and thereafter wrapping the doubled tape around both of the mandrels until a coil of the desired number of turns is achieved. The heating wire is coiled with the superconductive tape at the time that the tape is being wound. Suitable electrical connections have been made between the ends of the coiled tape and the terminals of the coil and between the electrical heating means and a suitable source of electrical current.

As was previously indicated, effective utilization of superconducting solenoids requires the use of a persistent current switch, this device allowing a superconducting solenoid to maintain its magnetic field without external power being supplied, following the initial energization of the coil. The manner in which the persistent current switch of this invention makes possible such effective utilization can best be seen by referring to the drawings.

In FIGURE 1, the numeral 10 indicates the superconductive tape which (as shown also in FIGURE 2) is of substantially greater width than thickness. This tape can be constructed of different superconductive compositions but is preferably constructed utilizing the superconductive compound, $Nb_3Sn$. One such tape highly suited for such application is that described and claimed in the copending application of Mark G. Benz, entitled "Superconductors and Process for Making Same," Ser. No. 506,686, filed Nov. 8, 1965. The coil portion of the superconducting switch is constructed by doubling a preselected length of the tape 10 about a mandrel 11 which has a radius greater than the minimum bending radius of the tape. It can be seen that in bending the tape about the mandrel in this fashion, a single thickness of the tape 10 is initially present about the mandrel. This portion of the tape forms a loop 12 about the mandrel. After the tape has been doubled in this fashion, it is bent or wrapped around the second of the two mandrels 13 so that it reverses in direction and proceeds back toward the mandrel 11. Thereafter, the double thickness of the tape is wrapped around both of the mandrels 11 and 13 until a coil having a preselected number of turns is obtained. The presence of the mandrels 11 and 13, whose radii exceed the minimum bending radius of the tape, make it possible to bend and coil the tape in bifilar fashion by insuring that no cracking or other mechanical breaks in the physical, and therefore electrical, integrity of the superconductor occurs. Since the superconducting tape 10 is doubled on itself, when current is passed through it there is no inductive current loss. This, of course, results from the fact that the field generated by the flow of current in one direction in the coil is exactly counterbalanced by the field arising from the current flow in the other direction.

Figure 2:
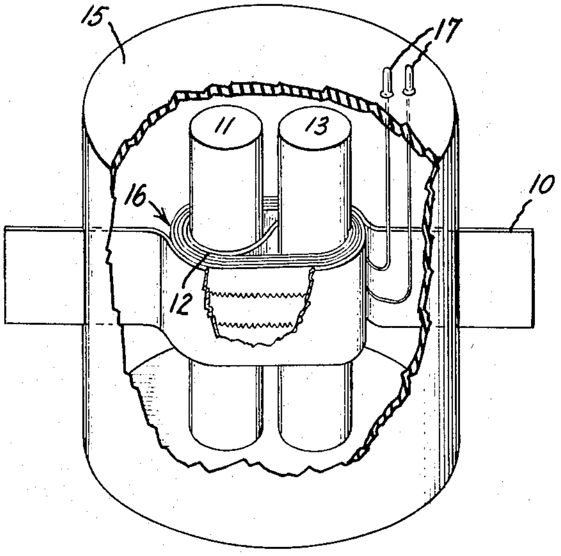
FIGURE 2 is a perspective view with parts broken away showing the manner in which the coil of the persistent current switch is mounted.

The entire persistent current switch assembly can best be understood by reference to FIGURE 2 of the drawings, numeral 15 indicating a suitable housing within which the coil 16 and mandrels 11 and 13 are located. Suitable electrical heating means 17 has been provided within the coil 16, so that by applying electricity through the terminals indicated, the temperature of the coil can be raised and driven from the superconductive to the normally resistive condition. In actual construction, the interior of housing 15 would be filled with a material having low thermal conductance so that the heat supplied to the sueronductive coil would not have to be overly large (because of the fact that the switch is located in an extremely low temperature environment).

Figure 3:
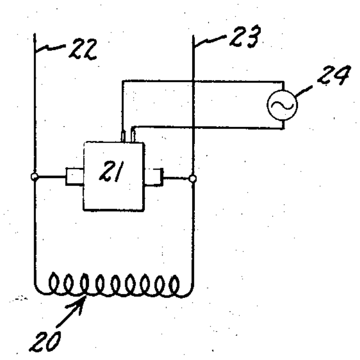
FIGURE 3 is a schematic illustrating the manner in which the persistent current switch is electrically-connected across the terminals of the solenoid.

FIGURE 3 shows somewhat diagrammatically a superconducting solenoid 20 having a persistent current switch 21 connected across its terminal. In operation, current would be supplied to the solenoid 20 through the terminals 22 and 23 and at this time electricity would be supplied to the electrical heating means of the persistent current switch 21 from some suitable source of electricity such as at 24. When the coil of the switch is in its normally conductive condition, all of the current supplied vis-a-vis terminals 22 and 23 will flow through the solenoid 20. At such time as when the desired degree of field has been created by solenoid 20, the electrical supply is removed from the resistive heater in persistent current switch 21 so that the superconductive coil 16 will pass from its normally conductive to its superconductive condition. At this time, external power is removed from solenoid 20 and the current that is already present in the system will then flow in a closed loop through solenoid 20 and persistent current switch 21.

The persistent current switch of this invention may be physically located near the solenoid and does not require special magnetic shielding since it is relatively independent of the magnetic field strength. The winding configuration provides a very low inductance (bifilar) and allows convenient access to the superconductive terminals.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. A persistent current switch constructed of a superconductive tape of greater width than thickness for use in conjunction with a superconducting solenoid, said switch comprising a pair of mandrels having radii larger than the minimum bending radius of the tape, a superconductive tape wound bifilarly about said mandrels, and electrical heating means for selectively heating said bifilar winding to change it from the superconductive to normally conductive condition when desired.

2. A persistent current switch as defined in claim 1 wherein said tape is bent around one of said mandrels to double on itself, bent around the other of said mandrels so that the doubled tape is reversed in direction toward the first of said mandrels and is then wrapped in doubled thickness around both of said mandrels.

References Cited

UNITED STATES PATENTS

| | | | |
|---|---|---|---|
| 3,096,421 | 7/1963 | Meissner | 200—166 |
| 3,145,248 | 8/1964 | Laguer | 200—166 |
| 3,255,335 | 6/1966 | Kortelink | 200—166 |

BERNARD A. GILHEANY, *Primary Examiner.*

GEORGE HARRIS, Jr., *Examiner.*